US006600105B2

(12) United States Patent
Nakata et al.

(10) Patent No.: US 6,600,105 B2
(45) Date of Patent: Jul. 29, 2003

(54) GROMMET EQUIPPED WITH RESIN INNER SLEEVE FOR FIXING CONNECTORS AND METHOD OF INSTALLING THE GROMMET

(75) Inventors: Hiroyuki Nakata, Yokkaichi (JP); Yukinori Morishita, Yokkaichi (JP); Tetsuaki Wada, Yokkaichi (JP); Takayuki Hieda, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 10/170,377

(22) Filed: Jun. 14, 2002

(65) Prior Publication Data

US 2002/0189838 A1 Dec. 19, 2002

(30) Foreign Application Priority Data

Jun. 18, 2001 (JP) ....................................... 2001-183972

(51) Int. Cl.$^{7}$ ................................................. H02G 3/18

(52) U.S. Cl. ................................ 174/65 G; 174/152 G; 174/153 G; 16/2.1

(58) Field of Search ........................... 174/65 G, 152 R, 174/142, 153 G, 152 G, 72 A, 135, 48; 16/2.1, 2.2; 439/34, 552, 567, 556, 559; 248/56; 361/826

(56) References Cited

U.S. PATENT DOCUMENTS 4,839,937 A * 6/1989 Oikawa et al. ......... 174/153 G
4,966,374 A * 10/1990 Oikawa et al. ......... 174/153 G (List continued on next page.)

FOREIGN PATENT DOCUMENTS

GB 2149469 A * 6/1985 ........... F16B/13/14
JP 06165340 A * 6/1994 ............ H02G/3/04
JP 08007688 A * 1/1996 ........... H01B/17/58
JP 08148218 A * 6/1996 ........... H01R/13/52

(List continued on next page.)

*Primary Examiner*—Dean A. Reichard
*Assistant Examiner*—Angel R. Estrada
(74) *Attorney, Agent, or Firm*—Greenblum & Bernstein, P.L.C.

(57) ABSTRACT

A grommet for installing a wire harness into a penetration hole of a car body panel of an automobile. The grommet includes an inner sleeve made of a resin that is configured to store and lock a connector. The inner sleeve is firmly stored in an enlarged tubular portion. A grommet main body is made of an elastomer and includes the enlarged tubular portion located at one end of a small diameter tubular portion through which electric wires of the wire harness may pass. A fixation locking hook for fastening the grommet to the car body panel is provided. The fixation locking hook protrudes from an outer face of one side of a peripheral wall of the inner sleeve. A movable locking hook is arranged on another side of the peripheral wall of the inner sleeve. The movable locking hook is arranged on a movable piece and is located between two side grooves arranged in the peripheral wall. Wherein, when the connector is locked in the inner sleeve, a first gap is provided between the peripheral wall and the connector on the side of the inner sleeve which has the fixation locking hook, and a second gap is provided between the peripheral wall and the connector on the side of the inner sleeve which has the mobile locking hook, such that second gap is greater than the first gap.

10 Claims, 8 Drawing Sheets

U.S. PATENT DOCUMENTS

| | | | | | |
|---|---|---|---|---|---|
| 5,044,986 | A | * | 9/1991 | Baumanis | 439/548 |
| 5,104,333 | A | * | 4/1992 | Hatagishi et al. | 439/559 |
| 5,123,862 | A | * | 6/1992 | Suzuki | 439/559 |
| 5,139,431 | A | * | 8/1992 | Saitoh et al. | 439/364 |
| 5,249,982 | A | * | 10/1993 | Funck et al. | 439/556 |
| 5,279,507 | A | * | 1/1994 | Kameyama | 439/552 |
| 5,300,734 | A | * | 4/1994 | Suzuki | 174/152 G |
| 5,454,737 | A | * | 10/1995 | Saba | 439/559 |
| 5,487,680 | A | * | 1/1996 | Yamanashi | 439/552 |
| 5,621,328 | A | * | 4/1997 | Yamanashi | 439/552 |
| 5,660,564 | A | * | 8/1997 | Yamanashi et al. | 439/557 |
| 5,904,584 | A | * | 5/1999 | Flask et al. | 439/157 |
| 6,081,964 | A | * | 7/2000 | Mori | 174/153 G |
| 6,303,869 | B1 | * | 10/2001 | Shanahan et al. | 174/153 G |
| 6,341,405 | B1 | * | 1/2002 | Uchida | 174/135 |
| 6,372,986 | B1 | * | 4/2002 | Saeki et al. | 174/65 G |
| 6,442,794 | B2 | * | 9/2002 | Uchida et al. | 174/152 G |

FOREIGN PATENT DOCUMENTS

| | | | | | |
|---|---|---|---|---|---|
| JP | 09039688 | A | * | 2/1997 | B66C/13/22 |
| JP | 09129066 | A | * | 5/1997 | H01B/17/58 |
| JP | 10261464 | | | 9/1998 | |
| JP | 11008020 | A | * | 1/1999 | B29C/53/02 |
| JP | 11234862 | A | * | 8/1999 | H02G/3/22 |
| JP | 2000217229 | A | * | 8/2000 | H02G/3/22 |
| JP | 2000311751 | A | * | 11/2000 | H01R/13/74 |
| JP | 2001236845 | A | * | 8/2001 | H01B/17/58 |
| JP | 2001266684 | A | * | 9/2001 | H01B/17/58 |

* cited by examiner

GROMMET EQUIPPED WITH RESIN INNER SLEEVE FOR FIXING CONNECTORS AND METHOD OF INSTALLING THE GROMMET

CROSS-REFERENCE TO RELATED APPLICATIONS

The present application claims priority under 35 U.S.C. §119 of Japanese Patent Application No. JP 2001-183972 filed on Jun. 18, 2001, the disclosure of which is expressly incorporated by reference herein in its entirety.

BACKGROUND OF THE INVENTION

1. Field of the Invention

The present invention relates to a grommet which is equipped with an inner sleeve made of a resin, and specifically relates to a grommet that is mounted on the penetration hole of a car body panel which is assembled on a wire harness and which is wired in an automobile. The inner sleeve made of a resin holds a connector and is internally fitted to the inside of the grommet main body that is made of elastic. The grommet is installed by being hooked in the penetration hole of a car body panel via a car body-hooking hook.

2. Description of Related Art

With this kind of grommet, when a door harness which is wired to a door side is hung in the penetration hole of a car body panel through the penetration hole of a door panel, for example, the grommet 1 as shown in FIG. 8 is typically installed on a wire harness between the door panel and the car body panel. Located in the grommet 1 is an inner sleeve 3 that is made of a resin. The inner sleeve 3 stores and retains a connector 5 and is assembled into the inside of the enlarged tubular portion 2*a* which is provided at an end of the grommet main body 2. The grommet main body 2 is made of a rubber or an elastomer. The grommet 1 is designed to be hooked into the penetrating hole H1 of car body panel A with only one touch by inserting the locking hook 3*a* provided on the outer face of the inner sleeve 3.

Specifically, the above-mentioned grommet 1 which is hooked in the penetration holes H1 and H2 provided on the car body panel A and on the door panel B, has enlarged tubular portion 2*c* which is mounted in the penetration hole H2 of the door panel B and is located at one end of the bellows shaped small diameter tubular portion 2*b* of the grommet main body 2. The grommet main body 2 is continuously formed with the above-mentioned enlarged tubular portions 2*a* and 2*c* and with bellows shaped small diameter tubular portion. A hooking groove 2*d* is located at an outer peripheral face of the enlarged tubular portion 2*c*. The hooking groove 2*d* is designed to be fitted in the peripheral rim of the penetration hole H2 and to be mounted in a sealed condition.

The inner sleeve 3 is made of a resin and is hooked and/or internally fitted in the enlarged tubular portion 2*a* of the car body panel A side. Locking hooks 3*a* and 3*b* are used for hooking into the car body and are located at opposite positions on an outer face of the inner sleeve 3. The inner sleeve 3 slightly protrudes from the edge opening of the enlarged tubular portion 2*a*. The locking hooks 3*a* and 3*b* are passed through the penetration hole H1 and hooked on the peripheral rim of the inner face side of the penetration hole H1. In this way, the grommet 1 is fixed on the car body panel in a condition in which sealing is maintained, i.e., by adhering the seal lip 2*f* which was provided on the opening peripheral rim of the enlarged tubular portion 2*a*, on the peripheral rim of the outer face side of the penetration hole H1. The connector 5 is brought in contact with the end of the wire harness W/H (not shown) and the wire harness W/H is inserted and passed through the grommet main body 2 while the connector is assembled thereto by a locking connection which is located inside of the above-mentioned inner sleeve 3. A fitting portion 5*a* of the connector 5 protrudes from the edge opening of the inner sleeve 3 and is fitted with the connector (not shown) via the car body side through the penetration hole H1 of the car body panel A.

With the above-mentioned grommet, the work involved in installing the grommet into the penetration hole H1 of the car body panel A in the assembly line of an automobile will now be described. A locking hook 3*a* located on one side of the inner sleeve 3 is a fixation locking hook which protrudes from the edge of the peripheral wall of the inner sleeve 3. On the other hand, a locking hook 3*b* located on another side of the inner sleeve 3 is a movable locking hook and is provided at the edge outer face of the mobile piece 3*d* (see FIGS. 10A and 10B), i.e., between two side grooves which are notched in the peripheral wall. As shown in FIG. 9, when installing the grommet 1 in the penetration hole H1, the edges of the enlarged tubular portion 2*a* and the inner sleeve 3 are typically obliquely inserted into the penetration hole H1. In this way, the locking hook 3*a* is first firmly inserted into the penetration hole H1 and then it is hooked. Thereafter, the movable locking hook 3*b* is inserted into the penetration hole H1 by bending it, and then it is hooked.

When the grommet 1 is assembled on an automobile, the movable locking hook 3*b* of the inner sleeve 3, which is inserted later into the penetration hole H1 on the car body panel A, can easily be made flexible. Therefore, the lower the insertion force, the better the workability. In addition, it is preferable, in view of the lock retaining force and the lock feeling, that a hooking margin of the movable locking hook 3*b* be made as large as possible. However, the space in which the movable locking hook is bent should also be made large enough in order to accommodate this.

On the other hand, because it is preferable that the penetration hole H1 of the car body panel be made as small as possible, it typically approaches the size of the fitting portion 5*a* of the connector 5. As a result, as shown in FIG. 10A, the peripheral wall of the inner sleeve 3, into which the connector 5 is inserted, is sized to the extent that it is close to the outer face of the connector 5, but with a slight gap S1. Accordingly, when the mobile locking hook 3*b* is bent greatly, the movable piece 3*d* whose edge is provided with the movable locking hook 3*b* comes into contact with the outer face of the connector 5, which gives rise to a problem that the movable locking hook 3*b* can only be bent by less than about 8°.

SUMMARY OF THE INVENTION

The present invention was achieved considering the above-mentioned problems, and provides a space for adequately bending the movable locking hook of the inner sleeve without enlargement of the external shape of the inner sleeve, the enlarged tubular portion of the grommet main body which internally receives the inner sleeve, and the penetration hole H1 of the car body panel.

In order to solve the above-mentioned subject, the present invention provides a grommet which can be installed on a wire harness inserted into a penetration hole that is provided on the car body panel of an automobile. An inner sleeve made of a resin stores and locks a connector and is firmly stored at an enlarged tubular portion of a grommet main body made of an elastomer and equipped with an enlarged tubular portion at the edge of a small diameter tubular portion through which electric wires are inserted. A locking hook for fastening to a car body protrudes at an opposite position on the peripheral wall of the above-mentioned inner sleeve and protrudes from the edge opening of the above-mentioned enlarged tubular portion. The locking hook is a fixation locking hook that protrudes from the outer face of the above-mentioned peripheral wall. Another locking hook is provided on another side of the inner sleeve. This locking hook has a mobile locking hook that is located on the edge outer face of a movable piece with the movable piece being between two side grooves that are notched on the above-mentioned peripheral wall. By shifting the position of the center of a connector housing that is firmly stored and/or retained in the above-mentioned inner sleeve and the center of the above-mentioned inner sleeve, and also by pushing aside the center of a connector housing to the fixation locking hook side, a large gap is provided between the connector housing and the movable piece having the movable locking hook, and this allows the bending amount of the movable piece to be made larger.

As described above, when the center of the connector housing and the center of the above-mentioned inner sleeve are deviated, and the connector housing, which is stored in the inner sleeve, is pushed aside to the fixation locking hook side, the gap between one side of the connector housing and the inner sleeve can be enlarged, and the movable piece and the movable locking hook can thus be more greatly bent towards the connector housing.

Accordingly, this arrangement allows for a reinforcement of a lock retention force by the movable locking hook and also improves the lock feeling of the grommet.

Further, while a larger gap in which the mobile locking hook can be adequately bent is provided for, the outer shape of the inner sleeve is not made larger, and it is not necessary to enlarge the enlarged tubular portion of the grommet main body, and/or the penetration hole of the car body panel in accordance with it.

The peripheral wall of the above-mentioned inner sleeve is a rectangular or near square-shaped frame. The above-mentioned mobile locking hook and the above-mentioned fixation locking hook are located on opposite short sides and the connector lock portion is provided at the center on one of the long sides. The connector housing is designed to be connected in the inner sleeve and can be locked in the inner sleeve at a position that is deviated somewhat from a center of the inner sleeve, in a condition in which the connector housing is closer to the short side of the inner sleeve which has the fixation locking hook than to the short side of the inner sleeve which has the movable locking hook.

The invention therefore provides for a grommet for installing a wire harness into a penetration hole of a car body panel of an automobile wherein the grommet includes an inner sleeve made of a resin that is configured to store and lock a connector wherein the inner sleeve is firmly stored in an enlarged tubular portion. A grommet main body is made of an elastomer and includes the enlarged tubular portion located at one end of a small diameter tubular portion through which electric wires of the wire harness may pass. A fixation locking hook is provided for fastening the grommet to the car body panel wherein the fixation locking hook protrudes from an outer face of one side of a peripheral wall of the inner sleeve. A movable locking hook is arranged on another side of the peripheral wall of the inner sleeve wherein the mobile locking hook is arranged on a movable piece that is located between two side grooves arranged in the peripheral wall. Wherein, when the connector is locked in the inner sleeve, a first gap is provided between the peripheral wall and the connector on the side of the inner sleeve which has the fixation locking hook, and a second gap is provided between the peripheral wall and the connector on the side of the inner sleeve which has the mobile locking hook, such that second gap is greater than the first gap.

When a connector housing of the connector is locked in the inner sleeve, a center of the connector housing is offset with respect to a center of the inner sleeve, thereby allowing the movable piece to be bent towards the connector housing.

The invention also provides for a grommet for installing a wire harness into a penetration hole of a car body panel of an automobile wherein the grommet includes a grommet main body made of an elastomer including an enlarged tubular portion located at one end of a small diameter tubular portion through which electric wires of the wire harness may pass. A connector is provided having a connector housing. An inner sleeve is made of a resin and is configured to receive the connector housing. The inner sleeve is retained within the enlarged tubular portion and includes a fixation locking hook and a movable locking hook. The fixation locking hook is arranged on one side of inner sleeve and the movable locking hook arranged on another side of the inner sleeve. A first gap is provided between the connector housing and the fixation locking hook. A second gap is provided between the connector housing and the mobile locking hook. The second gap is greater than the first gap.

The invention also provides a method of installing the grommet into a penetration hole of a car body panel of an automobile wherein the method includes installing the wiring harness in the grommet and hooking the inner sleeve into the penetrating hole so that the enlarged tubular portion engages the car body panel.

The invention also provides a grommet that includes a grommet main body including an enlarged tubular portion located at one end of a small diameter tubular portion through which electric wires of the wire harness may pass. An inner sleeve is retained within the enlarged tubular portion and includes a fixation locking hook and a movable locking hook. The fixation locking hook is arranged on one side of inner sleeve and the movable locking hook arranged on another side of the inner sleeve. A first gap is provided between the connector housing and the fixation locking hook. A second gap is provided between the connector housing and the mobile locking hook. The second gap is greater than the first gap.

The grommet may further include a connector having a connector housing. The inner sleeve may be configured to receive the connector housing. The inner sleeve may be made of resin.

The invention also provides for a method of installing the grommet into a penetration hole of a car body panel of an automobile wherein the method includes installing the wiring harness in the grommet and hooking the inner sleeve into the penetrating hole so that the enlarged tubular portion engages the car body panel.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

Figure 1:
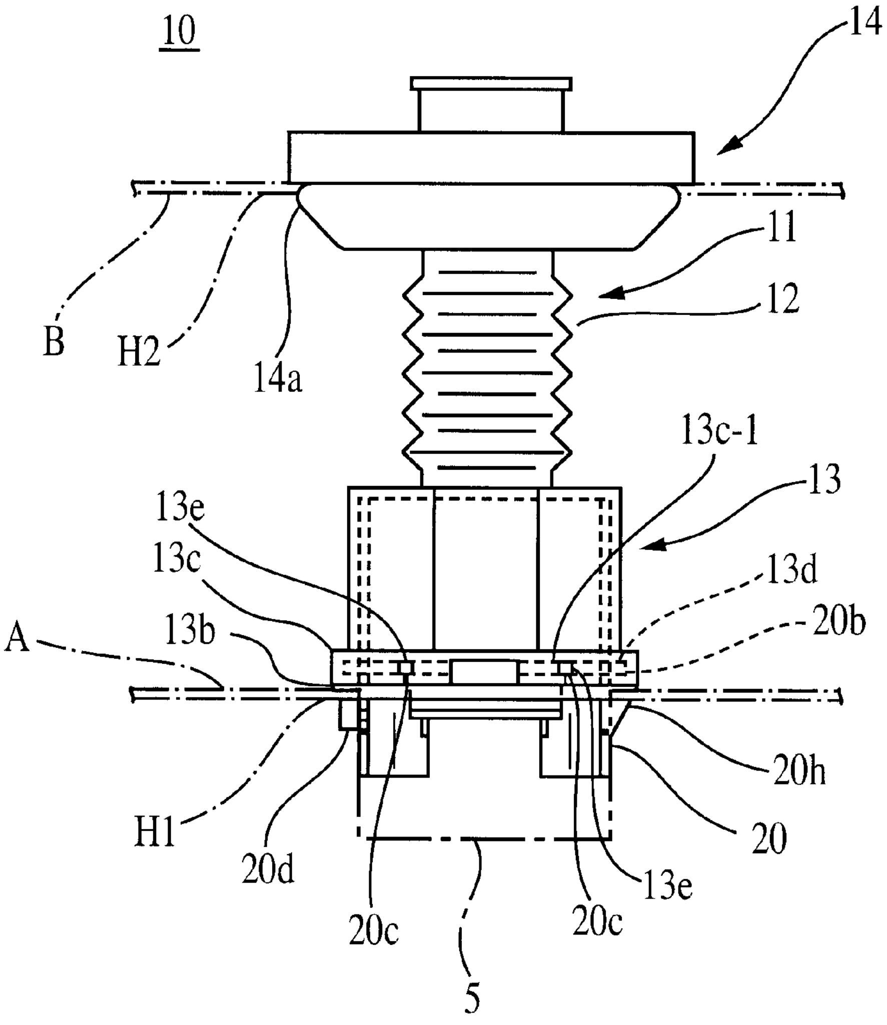
FIG. 1 shows a frontal view of the first embodiment of the grommet of the present invention.
Figure 2:
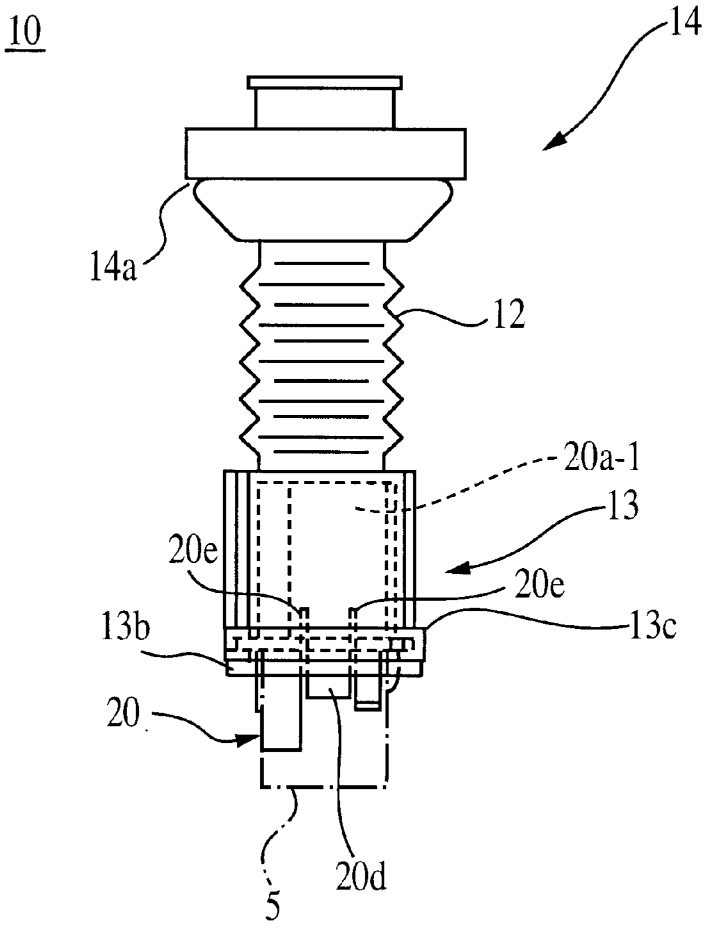
FIG. 2 shows a side view of FIG. 1.
Figure 3:
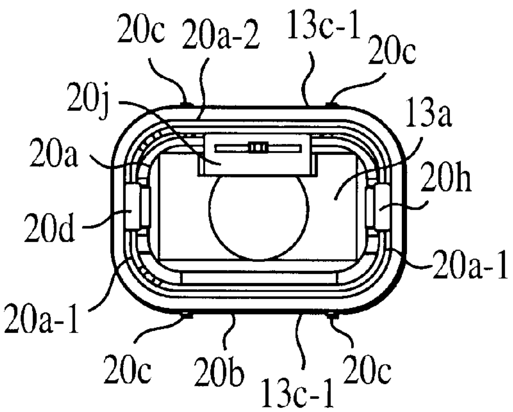
FIG. 3 shows a bottom view of FIG. 1.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

After the grommet is passed through the penetration hole H2 of the door panel B in a conventional manner, the grommet receives the door harness which passes through the penetration hole H1 on the car body panel A. Then, the connector 5 is connected and locked, with the end of the door harness, inside of the grommet 10.

The grommet 10 includes a grommet main body 11 that is made, for example, of a rubber or an elastomer, and a resin inner sleeve 20. The grommet main body 11 is continuously formed, molded and/or integrally made with the enlarged tubular portions 13 and 14 which are located the both ends of the bellows shape and small diameter tubular portion 12. The grommet 10 allows insertion of electric wires, and stores or retains the inner sleeve 20 made of a resin inside the enlarged tubular portion 13. A car body hooking groove 14*a* is utilized to mount the grommet 10 in the penetration hole H2 of the door panel B. The groove 14*a* is concave-shaped and is located at the outer-peripheral of the above-mentioned enlarged tubular portion 14.

The enlarged tubular portion 13 stores and retains the inner sleeve 20, has a rectangular or near square tubular shape, and includes a seal lip 13*b* which has an externally opened shape and protrudes at the outer periphery of an edge opening 13*a*. An inner sleeve hooking portion 13*c* has a sectional C-shape or D-shape, is located at an opening peripheral rim, and integrally formed with the seal lip 13*b*. Hooking flange portions 20*b* protrude from the peripheral wall 20*a* of the inner sleeve 20 and are inserted and hooked in flange grooves 13*d* formed in inner sleeve hooking portion 13*b*. The flange grooves 13*d* are opened at the inner peripheral face of the inner sleeve hooking portion 13*c*. Pin holes 13*e* protrude or extend from the bottom face of the flange grooves 13*d* at both of the opposite long sides 13*c*-1, and pins 20*c* protrude or extend from the hooking flange portions 20*b* of the inner sleeve and are inserted in pin holes 13*e*.

Located on the peripheral wall 20*a* of the inner sleeve 20 which protrudes or extends from the edge opening 13*a* of the above-mentioned enlarged tubular portion 13 is the fixation locking hook 20*d*. This hook 20*d* protrudes from the edge outer face of one of the oppositely arranged short side walls 20*a*-1. A movable piece 20*f* is arranged between a pair of notched side grooves 20*e* in a short side wall 20*a*-1, which is arranged opposite the short side wall having the fixation locking hook 20*d*. The movable locking hook 20*h* has a width that extends over an entire width of the movable piece 20*f* and is located an edge thereof. The movable hook 20*h* protrudes from the peripheral wall 20*a*-1 and is located between the grooves 20*e*. The width of the above-mentioned fixation locking hook 20*d* is substantially the same width of the movable locking hook 20*h*.

A connector locking portion 20*j* is located at or near the approximate center or middle of one side of the long side wall 20*a*-2 of the peripheral wall 20*a* of the above-mentioned inner sleeve 20. The connector 5 is mounted in the inner sleeve 20 in a manner which a deviation amount or distance is utilized between the center position P1 of the connector locking portion 20*j* and the center position P2 of the long side wall 20*a*-2. This deviation is designated to be dimension L1 in FIG. 4. In the embodiment disclosed, the dimension L1 of the above-mentioned positional deviation amount is set to be approximately 1.4 mm.

Figure 4:
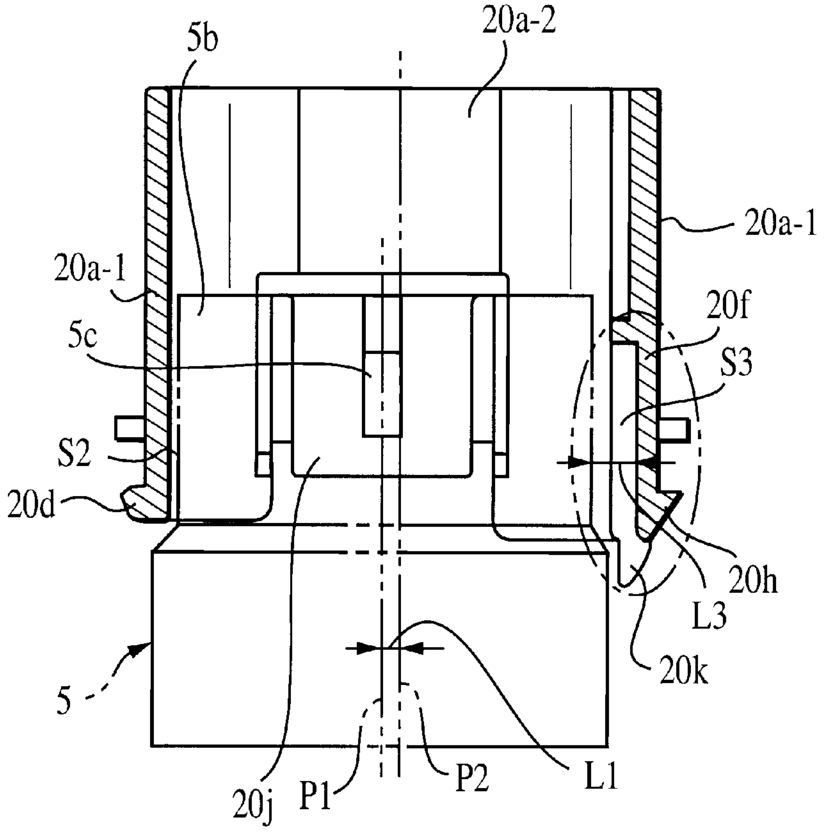
FIG. 4 shows a sectional view of an inner sleeve.

As shown in FIG. 4, the connector 5 that is internally fitted in the inner sleeve 20 includes the locking portion 5*c* and is located at a center of outer face of the connector housing 5*b*. In this manner, the connector 5 is stored and/or retained in the inner sleeve 20, and when the locking portion 5*c* of the connector 5 is connected by locking it with the connector locking portion 20*j*, whose position was deviated from center, the connector 5 is fixed in a condition in which its center position is deviated in the inner sleeve 20. As a result of this configuration, only a slight gap S2 is provided between the outer face of the connector housing 5*b* of the connector 5 and the short side wall 20*a*-1 at the fixation locking hook 20*d* side. On the other hand, this configuration provides for a large gap S3, whose width is designated L3, between the movable piece 20*f* and connector housing 5*b*. The large gap S3 is thus approximately 1.4 mm larger in comparison than if the connector 5 was arranged in the center of the inner sleeve.

Figure 5:
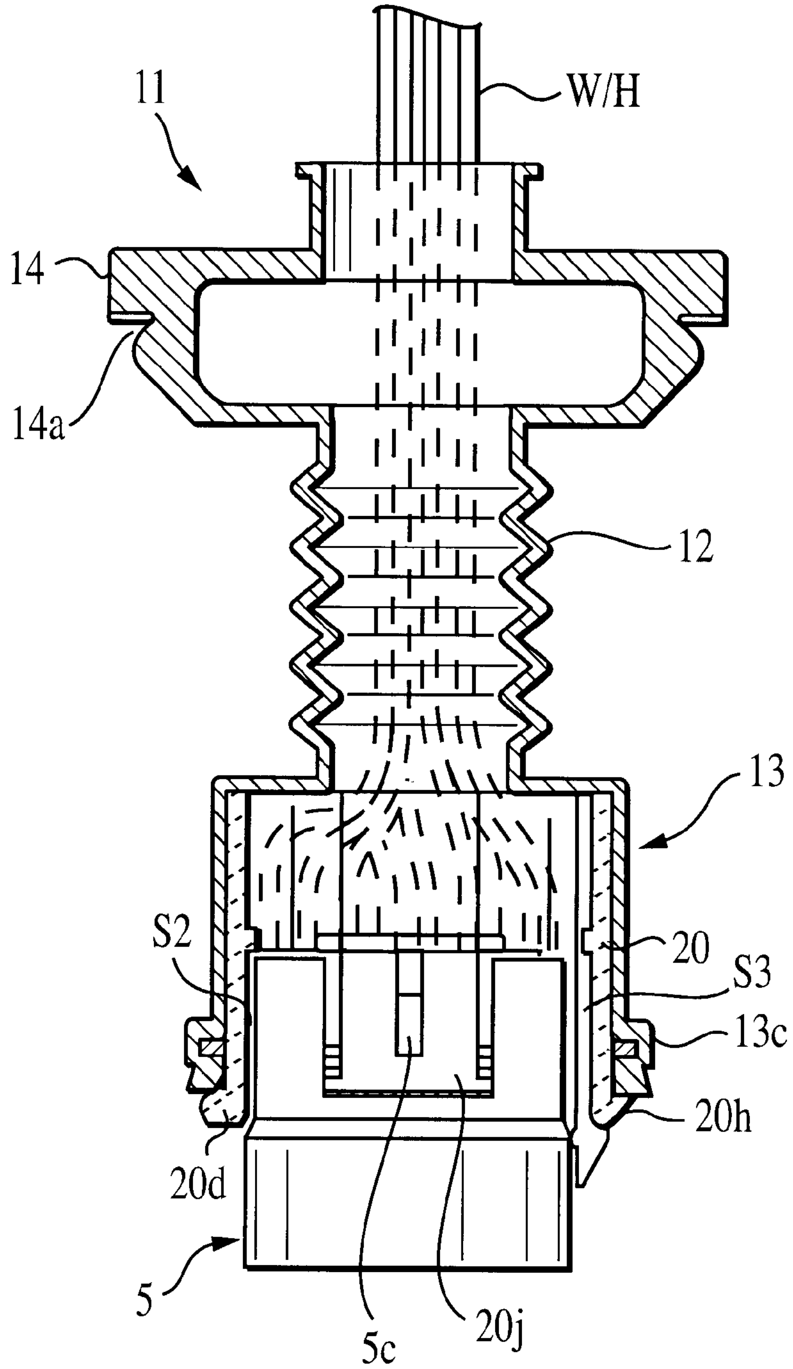
FIG. 5 shows a sectional view of a condition in which electric wires with a connector were passed in a grommet.

As shown in FIG. 5, when the wire harness W/H is inserted into the grommet main body 11 having the above-mentioned configuration, the connector 5 which was connected with the edge of wire harness W/H is fixed in the inner sleeve 20. Then, the grommet 10, which stores and retains the inner sleeve 20 in the enlarged tubular portion 13, is assembled in an automobile assembly line, such that the locking hook 20*d* of the inner sleeve 20 is inserted and hooked in the penetration hole H1 of the car body panel A through the penetration hole H2 of the door panel B.

Figure 6A:
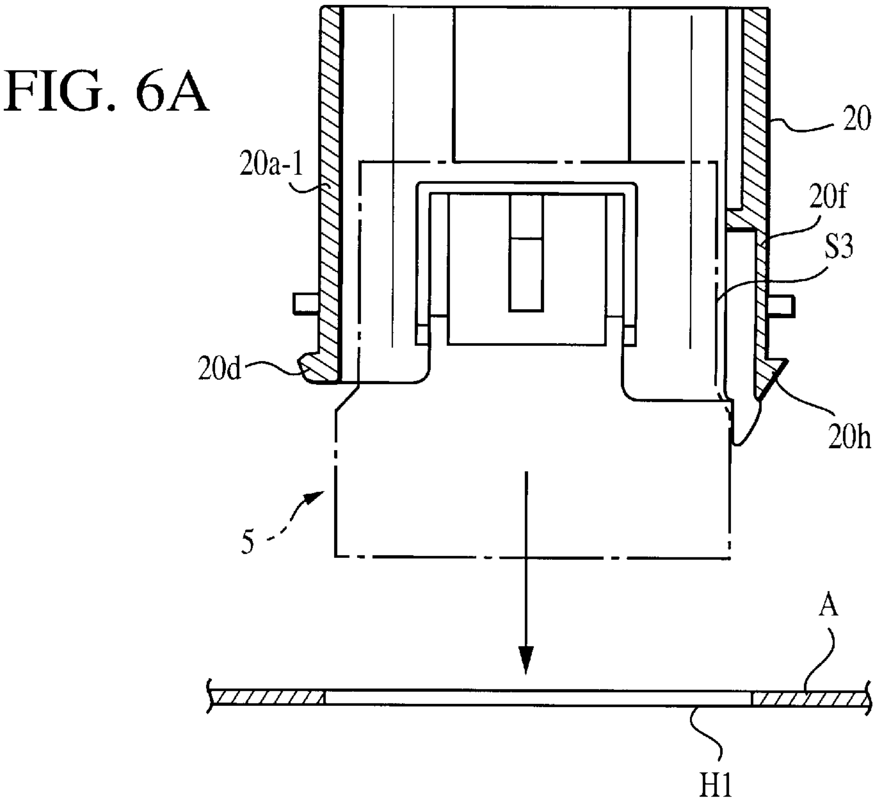
FIGS. 6A and 6B are drawings showing a hooking of a grommet on a car body panel.
Figure 6B:
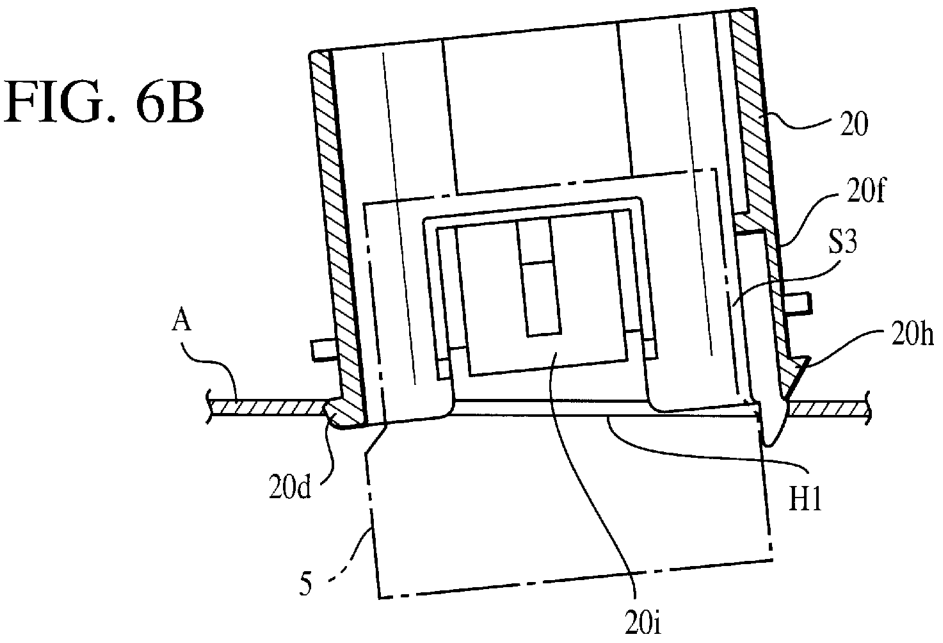

At this instant, as shown in FIGS. 6A and 6B, the edge face of the inner sleeve 20 is inclined against the penetration hole H1, such that, firstly the fixation locking hook 20*d* is inserted, and the grommet 10 has one end hooked in the penetration hole H1. Then, the movable locking hook 20*h* is inserted into the penetration hole H1 while the movable piece 20*f* experiences bending towards the inside. Then, when the movable hook 20*h* passes through the penetration hole H1, the mobile piece 20*f* returns to an original position and is hooked in the penetration hole H1 (e.g., see FIG. 1).

Figure 7:
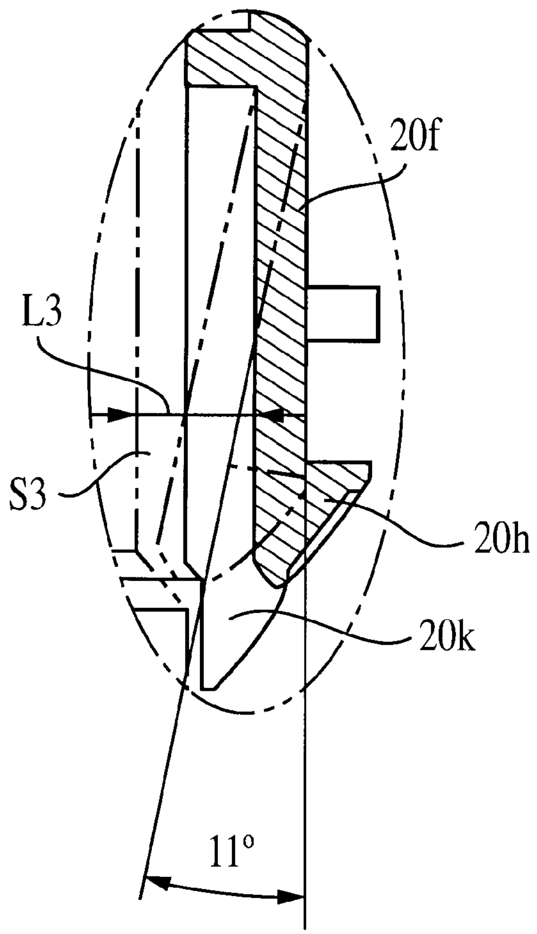
FIG. 7 shows a sectional view showing a condition for bending a movable locking hook.
Figure 8:
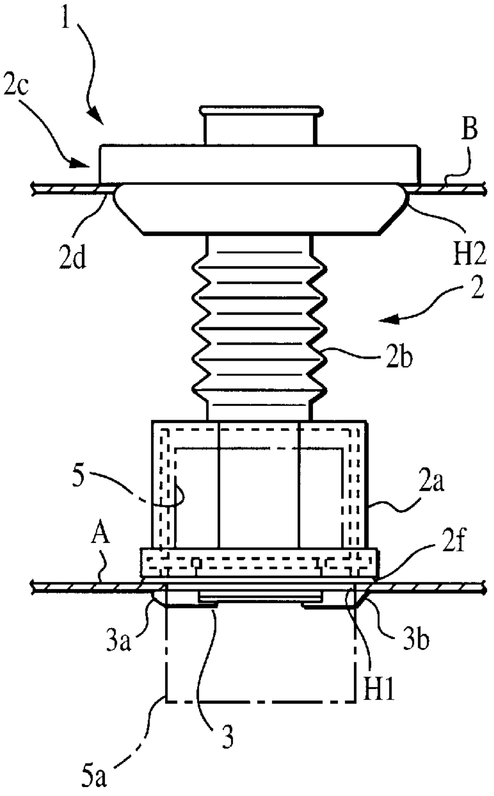
FIG. 8 PRIOR ART
FIG. 8 shows a frontal view showing a conventional grommet.
Figure 9:
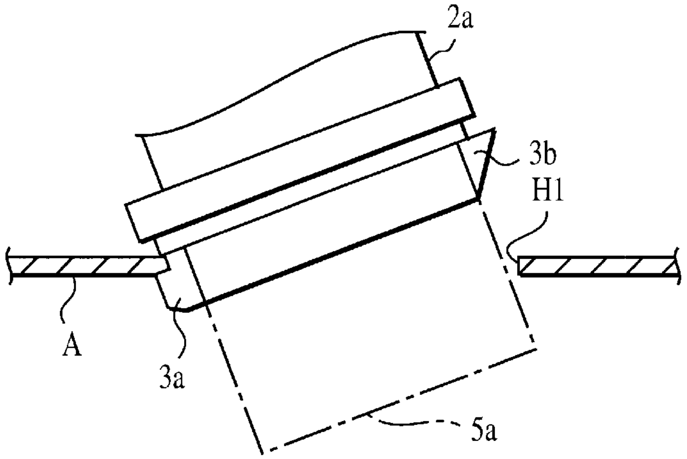
FIG. 9 PRIOR ART
FIG. 9 shows a schematic view showing the installing of the conventional grommet on a car body.
Figure 10A:
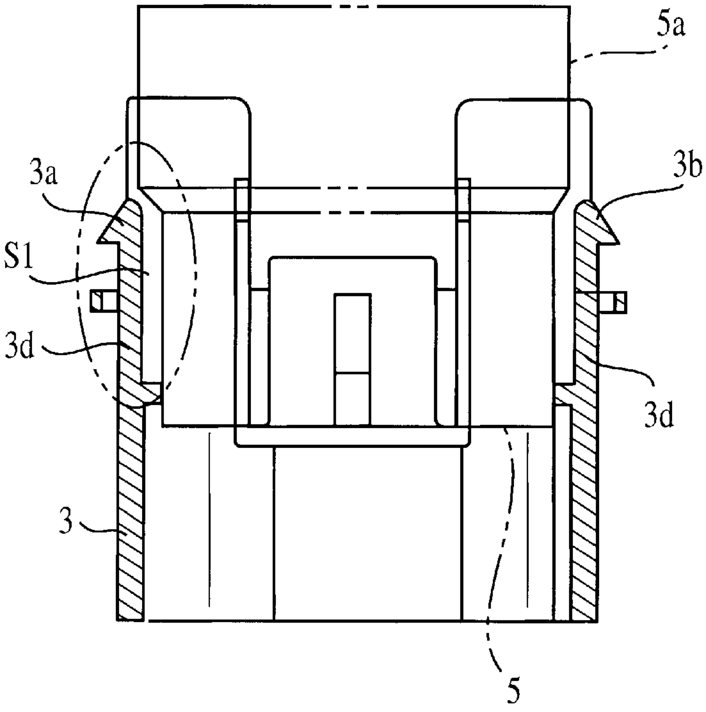
FIG. 10A PRIOR ART
FIG. 10A shows a sectional view illustrating a relation of the inner sleeve of a conventional grommet with a connector.
Figure 10B:
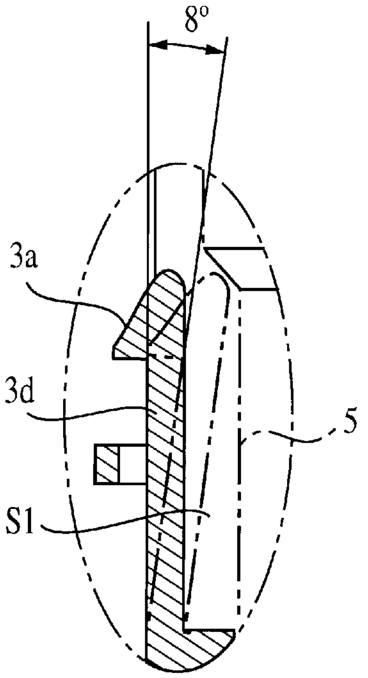
FIG. 10B PRIOR ART
FIG. 10B shows a sectional view showing a condition for bending a movable locking hook.

Since there exists a large gap S3 between the movable piece 20*f* and the connector housing 5*b*, during the inserting and hooking of the movable locking hook 20*h*, the movable piece 20*f* and the movable locking hook 20*h* can be more greatly bent towards the inside as shown in FIG. 7, and as a result, the lock feeling and/or performance can be enhanced, and the hooking force can be reinforced.

Further, since there is relatively no bending at the fixation locking hook 20*d* side of the inner sleeve 20, no problem results from the gap S2 between the inner sleeve peripheral wall 20*a*-1 and the connector housing 5*b* being relatively small.

As should be clear from the above-noted description, the present invention provides for a grommet in which an inner sleeve is stored in a grommet main body and the connector, located at one end of a wire harness and inserted into the grommet main body, is fixed by locking in the inner sleeve. The center positions of the connector and the inner sleeve are deviated and are fixed by locking. A large gap is set and/or provided between the inner sleeve and the connector housing at a movable locking hook side of the inner sleeve. Using this configuration, the grommet can be inserted and hooked into a car body panel in a penetration hole such that the mobile locking hook can be more greatly bent.

As a result, the invention provides for an improvement in the lock feeling and/or performance, and allows for the lock retention force to be improved without enlarging the outer shape of the inner sleeve.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A grommet for installing a wire harness into a penetration hole of a car body panel of an automobile, the grommet comprising:

an inner sleeve made of a resin that is configured to store and lock a connector wherein the inner sleeve is firmly stored in an enlarged tubular portion;

a grommet main body made of an elastomer and including the enlarged tubular portion located at one end of a small diameter tubular portion through which electric wires of the wire harness may pass;

a fixation locking hook for fastening the grommet to the car body panel wherein the fixation locking hook protrudes from an outer face of one side of a peripheral wall of the inner sleeve; and a movable locking hook arranged on another side of the peripheral wall of the inner sleeve wherein the movable locking hook is arranged on a movable piece that is located between two side grooves arranged in the peripheral wall, wherein, when the connector is locked in the inner sleeve, a first gap is provided between the peripheral wall and the connector on the side of the inner sleeve which has the fixation locking hook, and a second gap is provided between the peripheral wall and the connector on the side of the inner sleeve which has the movable locking hook, such that the second gap is greater than the first gap.

2. The grommet of claim 1, when a connector housing of the connector is locked in the inner sleeve, a center of the connector housing is offset with respect to a center of the inner sleeve, thereby allowing the movable piece to be bent towards the connector housing.

3. A grommet for installing a wire harness into a penetration hole of a car body panel of an automobile, the grommet comprising:

a grommet main body made of an elastomer including an enlarged tubular portion located at one end of a small diameter tubular portion through which electric wires of the wire harness may pass;

a connector having a connector housing;

an inner sleeve made of a resin that is configured to receive the connector housing;

the inner sleeve being retained within the enlarged tubular portion and comprising a fixation locking hook and a movable locking hook;

the fixation locking hook being arranged on one side of inner sleeve and the movable locking hook arranged on another side of the inner sleeve;

a first gap being provided between the connector housing and the fixation locking hook; and a second gap being provided between the connector housing and the movable locking hook, wherein the second gap is greater than the first gap.

4. A method of installing the grommet of claim 1 into a penetration hole of a car body panel of an automobile, the method comprising:

installing the wiring harness in the grommet; and hooking the inner sleeve into the penetrating hole so that the enlarged tubular portion engages the car body panel.

5. A method of installing the grommet of claim 3 into a penetration hole of a car body panel of an automobile, the method comprising:

installing the wiring harness in the grommet; and hooking the inner sleeve into the penetrating hole so that the enlarged tubular portion engages the car body panel.

6. A grommet comprising:

a grommet main body including an enlarged tubular portion located at one end of a small diameter tubular portion through which electric wires of a wire harness may pass;

an inner sleeve being retained within the enlarged tubular portion and comprising a fixation locking hook and a movable locking hook;

the fixation locking hook being arranged on one side of the inner sleeve and the movable locking hook arranged on another side of the inner sleeve;

a first gap being provided between a connector housing and the fixation locking hook; and a second gap being provided between the connector housing and the movable locking hook, wherein the second gap is greater than the first gap.

7. The grommet of claim 6, further comprising a connector having a connector housing.

8. The grommet of claim 7, wherein the inner sleeve is configured to receive the connector housing.

9. The grommet of claim 6, wherein the inner sleeve is made of resin.

10. A method of installing the grommet of claim 6 into a penetration hole of a car body panel of an automobile, the method comprising:

installing a wiring harness in the grommet; and hooking the inner sleeve into the penetrating hole so that the enlarged tubular portion engages the car body panel.

* * * * *